(12) United States Patent
Ljungren (10) Patent No.: US 8,093,511 B2
(45) Date of Patent: Jan. 10, 2012

(54) CEILING SUSPENSION ASSEMBLY (75) Inventor: Karin Ljungren, Stockholm (SE)

(73) Assignee: Creality AB, Stockholm (SE)

( * ) Notice: Subject to any disclaimer, the term of this patent is extended or adjusted under 35 U.S.C. 154(b) by 335 days.

(21) Appl. No.: 12/547,823

(22) Filed: Aug. 26, 2009

(65) Prior Publication Data

US 2011/0048793 A1 Mar. 3, 2011

(51) Int. Cl.
*H02G 3/20* (2006.01)
(52) U.S. Cl. ............... 174/491; 52/39; 248/343; 362/96
(58) Field of Classification Search .................. 174/491; 52/39; 248/343; 416/244 R; 362/96
See application file for complete search history.

(56) References Cited

U.S. PATENT DOCUMENTS

| | | | | |
|---|---|---|---|---|
| 4,727,587 A | * | 2/1988 | Black | 381/395 |
| 6,479,750 B1 | * | 11/2002 | Popescu et al. | 174/70 R |
| 6,531,656 B1 | * | 3/2003 | Grote et al. | 174/491 |
| 7,568,313 B1 | * | 8/2009 | Matley | 52/39 |
| 7,837,172 B2 | * | 11/2010 | Johnson et al. | 248/343 |

* cited by examiner

*Primary Examiner* — Dhiru R Patel
(74) *Attorney, Agent, or Firm* — Holland & Hart (57) ABSTRACT

A ceiling suspension assembly for suspending an object in a cable, cord or string (51) from a ceiling includes a ceiling fitting, cover or casing (25) and a suspension device (1). The suspension device is adapted to be attached to the ceiling such as fastened to a hook, ring or shackle. The suspension device and the ceiling fitting, cover or casing have cooperating threadings which allow them to be screwed to each other and thereby take varying vertical positions in relation to each other. The suspension device can includes a projecting elongated portion that extends downwards, has an axial channel for receiving the cable, cord or string and an exterior threading. The ceiling fitting, cover or casing can includes a portion having a through-hole with an interior threading for cooperation with the exterior threading of the projecting elongated portion to give the ceiling fitting, cover or casing a desired position such as being in tight engagement with the ceiling. The ceiling cover, casing or fitting can be composed of two separate parts, one (33) of which has at its bottom a large aperture (37) in which a connector plug (53) can be introduced and the other part (35', 35") can be divided along an axial plane.

22 Claims, 9 Drawing Sheets

CEILING SUSPENSION ASSEMBLY

TECHNICAL FIELD

The present invention generally relates to the field of accessories for electrical and non-electrical appliances and in particular it relates to a suspension assembly for hanging an object such as an electrical lamp from a ceiling or similar surface in a cable, cord or string.

BACKGROUND

In homes, offices, restaurants, general rooms in buildings, such as factories, hotel rooms, conference rooms, reception areas, corridors, shops, there are different appliances which may generally be electric, but also may be of other kinds such as decorations, information boards, and which are hanging from or are attached to the ceiling in the considered room or area. Examples include pendant lamps, spot lamps, loud speakers, display devices, decorative objects, TV monitors, fans, information boards, blind covers, ceiling platforms, etc. These examples of areas and of appliances are by no means to be considered complete, as many other application areas could be found and mentioned.

Attached to a pendant lamp, there is in most cases a ceiling cover or fitting, the use of which normally aims at collecting and covering the connector/plug/socket, the suspension, the hook and the remaining cord from the lamp itself. One common disadvantage of existing ceiling covers or fittings is that it is difficult to keep the cover or fitting in a straight position, related to and in a tight engagement with the ceiling. In addition, in many cases, the cover or fitting can have a tendency of sliding downwards along the cord, since the attachment to the cord often is not reliable.

However, fixed length metal pipes can be mentioned which exist e.g. for the suspension of lamp globes. Then the ceiling fitting or cover does not slide because it can be rigidly secured to the pipe.

Ceiling fittings or covers of various designs have been disclosed in the prior art, such as in e.g. the documents DE2932334, DK9400492, EP1580481A1, EP1612475A1, FR2117772, FR2280859A1, FR2474144A1, FR2664365A1, GB0202056A, GB2251983A, GB2330015A, GB2375900A, U.S. Pat. No. 6,034,328, WO 97/01063, WO9621123A1. In several documents it is disclosed how a tight fit between the body of the ceiling fitting or cover can be achieved by the use of barbs, hooks, elastic elements, elongated members, ceiling screws, etc. in order to establish a desired lasting, non-sliding attachment of the body to the cord or to the ceiling.

In experiments with ceiling fittings or covers according to the prior art it has been realized that an improved solution for the suspension and ceiling fitting fixation is needed.

In particular, a ceiling fitting, casing or cover should be configured so that it is and stays in a tight engagement with the ceiling, so that the load of the weight of the fitting or cover is not taken by the cord, so that it anchors the fitting or cover to the hook or similar fixed suspension anchorage in relation to the ceiling, and offers a suspension which is variable in relation to the size of the cover and the length of the hook or similar fixed suspension anchorage, and which can be both easily mounted and dismounted for moving the lamp or similar suspended device to another location without requiring the use of any tools and without causing damage to the cord or ceiling. It should also allow for an electrically safe mounting of the appliance to the new cover or fitting.

In the prior art some of these problems are addressed. For example, in FR2117772 and FR2474144A1 ceiling suspension assemblies are disclosed that include a ceiling cover and a ceiling anchoring part which can be screwed in relation to each other to make the ceiling cover come in contact with the surface of the ceiling. However, it is difficult and/or unsafe to mount and dismount many of the suggested designs and many of the suggested designs are also dependent on a safe attachment of the fitting or cover to the cord itself for a proper positioning of the cover or fitting. In some embodiments a fixed ceiling anchorage is accomplished by screws or plugs penetrating into the ceiling. It is not easy to mount or dismount such designs without causing damage to either the ceiling or the cord itself.

Another disadvantage of the current ceiling fittings or covers that conventionally accompany an electrical lamp or other appliance, or of spare part covers that can be acquired separately, is that these fittings or covers do not allow the entry of a cord having a connector plug attached to the end thereof. This causes unnecessary danger as someone who wishes to exchange the ceiling cover or fitting is forced to first either cut the cord or to dismount the connector plug, then perform the exchange and finally reinstall a new plug to the end of the cord after threading it through the small aperture of a new fitting. The same problem appears with other appliances having a fixed object attached to the end of the cord or string. The published International patent application WO96/21123 discloses a design that can be opened at the side thereof. However, this design still depends on the safe attachment of the ceiling cover or fitting to the actual cord.

Another problem is that many ceiling fittings or covers are not stable or large enough to both carry the whole length of the cord etc. that is to be hidden, nor are they stable enough to sit straight just by an attachment to the cord in or in the vicinity of the lower aperture of the fitting.

Although some modern lamps are equipped with only a multipole connector which should be directly connected to the cables in an outlet in the ceiling, there is still generally a problem with fitting both the remaining cord, the hook and possibly a pipe from which the socket cords exit, or a fixed ceiling socket. This requires space. There is also the problem of arranging this type of cover or fitting in a straight position to the ceiling, as well as so that it is not sliding downwards along the cord.

Some ceilings are not straight but instead sloping, whereas the problem for the cover to come in tight engagement with the ceiling simply by an attachment to the cord become even more obvious.

Similar problems appear with other objects to be hung from or attached to the ceiling but which do not include a cable, cord or string in which the object is to be hung but where the object should be hung directly on a hook, ring or similar ceiling anchorage. There are generally no means for these type of objects to sit straight to the ceiling.

SUMMARY

It is a general object of the present invention to provide a ceiling suspension assembly that fulfills one or more of the above needs.

It is another object of the present invention to provide a ceiling suspension assembly that can be easily mounted and/or dismounted.

It is another object of the present invention to provide a ceiling suspension assembly that allows an easy mounting of an electrical or non electrical cable, cord or string for an object to be hung from a ceiling.

It is another object of the present invention to provide a ceiling suspension assembly that can sit straight and in tight engagement with the ceiling surface.

One or more of the above objects are achieved by the ceiling suspension assemblies defined in the accompanying claims.

Generally, a ceiling suspension assembly is provided for use in combination with various appliances, e.g. an electrical pendant lamp hanging from a ceiling in a room, hanging in its cord from a hook or similar device and connected to an electrical socket or connector in the ceiling, alternatively to an extension cord, the socket of which is placed nearby in the ceiling or on a wall.

The ceiling suspension assembly may in one aspect be designed so that it does not require an electrical connector at the end of a suspending electrical cable or cord to be dismounted from the cable or cord in order to mount the ceiling suspension assembly.

Hence, a ceiling suspension assembly is provided that includes a ceiling cover, casing or fitting that can be used to house and cover the electrical plug, suspension, hook and the remaining cord of an appliance hanging as a pendant from a ceiling.

The hook or similar device from which the pendant lamp or other appliance is hanging is used as a central point in the suspension in order to secure a secure connection to the ceiling and at the same time remove the weight of the ceiling cover or fitting from the electrical cord allowing the weight to be taken by the fixed hook or similar device. This may allow the cover or fitting to find a correct position such as aligned with the ceiling, instead of being dependent on the secure fastening of a screw to the ceiling, or any members, barbs, screws etc. that are aimed at fixing the cover to the cable, cord or string.

Thus generally, a ceiling suspension assembly that is adapted to hang or suspend an object in a cable, cord or string from a ceiling comprises a ceiling fitting, cover or casing and a suspension device. The suspension device is adapted to be attached to the ceiling such as fastened to a hook, ring or shackle. The suspension device and the ceiling fitting, cover or casing have cooperating threadings which allow them to be screwed to each other and thereby take varying vertical positions in relation to each other. In particular, the suspension device can comprise a projecting elongated portion that extends downwards, has an axial channel for receiving the cable, cord or string and an exterior threading. The ceiling fitting, cover or casing can comprise a portion having a through-hole with an interior threading for cooperation with the exterior threading of the projecting elongated portion.

The ceiling cover, casing or fitting can be composed of two separate parts, one of which has at its bottom a large aperture in which a connector plug can be introduced and the other part can be divided along an axial plane.

BRIEF DESCRIPTION OF THE DRAWINGS

The invention will now be described by way of non-limiting exemplary embodiments with reference to the accompanying drawings in which.

DETAILED DESCRIPTION

Most ceiling electric lamps and other electrical ceiling appliances hang in their own electrical cable which in a simple case can extend through holes of a suspension device thereby securing the cable to the suspension device. The suspension device is in a simple case a plate having 2-3 holes, the cable passing at least through two of the holes. The suspension device can use one of the holes or alternatively have an S hook or similar device for attaching it to a suspension hook, ring or shackle attached to and extending downwards from the ceiling.

As seen in FIGS. 1a-1d such a suspension device 1 can be designed to include an elongated portion 3 that in use projects in a downward direction and allows a cover or casing to be attached thereto. The projecting portion can, as illustrated, have an exterior threading 5, i.e. it can substantially be a screw portion, for attaching the cover or casing to it. The projecting portion 3 has a longitudinal channel 7 intended to receive an electrical cable, not shown, or generally some suspension cord or string for a suspended device or appliance, not shown.

Hence, the projecting portion substantially encloses a portion of the cable located in the channel.

Figures 1A, 1B:
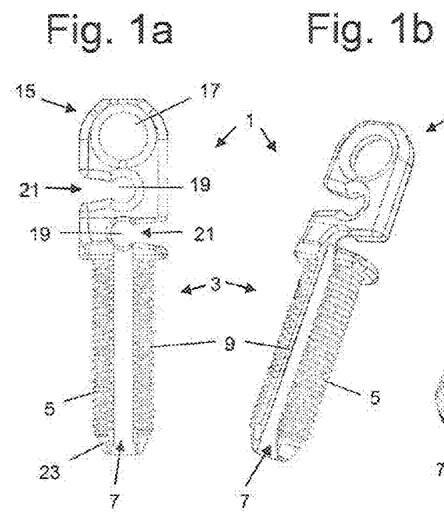
FIGS. 1a, 1b, 1c and 1d are a front view, two perspective views from the front and a perspective rear view of a suspension device, respectively.
Figures 1C, 1D:
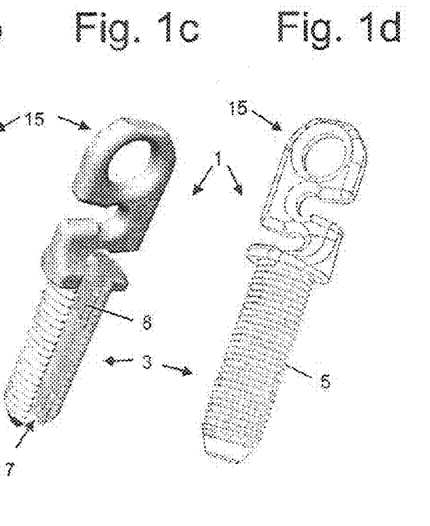
Figure 2A:
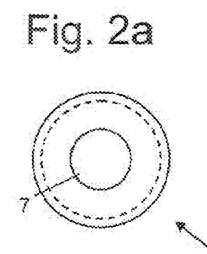
FIGS. 2a, 2b, 2c, 2d and 2e are cross-sectional views illustrating different embodiments of a projecting portion for housing a cable or string and included in a suspension device.
Figure 2B:
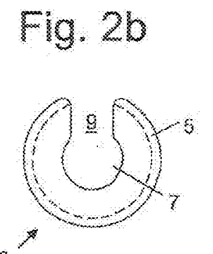

The projecting portion 3 can be designed so that a cable or suspension string can be inserted into the channel 7 without making it necessary for a person to make a free end of the cable or string to enter an end opening of the channel and then feed the free end in order to make it pass through the channel. This can e.g. be achieved by providing a longitudinal groove or opening 9 extending over the length of the projecting portion and also extending from the channel 7 to the exterior surface of the projecting portion 3. This longitudinal opening can have a width that is adapted so that a cable can be pressed therethrough into the channel which can be wider than the longitudinal opening. The longitudinal opening 9 may thus be narrower than the channel 7, not allowing the cable or string to laterally come out of the channel, see the sectional view of FIG. 2b. An alternative way of adapting is the longitudinal opening 9 to be narrower than the channel 7 is to add one or more projections 8 extending from the walls of the groove or opening 9 as illustrated in FIGS. 1c and 2e. The projections 8 can be longitudinal, i.e. elongated in the axial direction of the projecting portion 3.

Figure 2C:
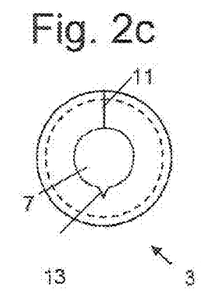
Figure 2D:
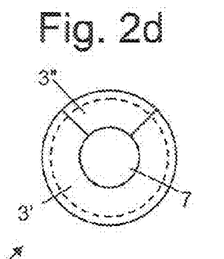
Figure 2E:
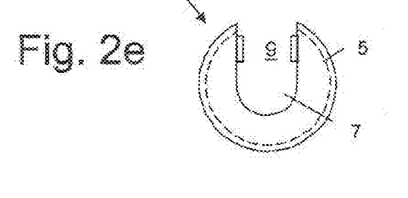

Another way of allowing a cable to be laterally inserted in the channel 7 may include that instead of the opening 9 a corresponding slot 11 having substantially zero width, see the sectional view of FIG. 2c, is provided, and that the projecting portion 3 is made so that it can be elastically opened to press the cable or string through the widened slot into the channel 7. This can be achieved by making the projecting portion from an elastic material allowing such a movement and/or by providing a hinge or weakened portion indicated at 13 in the wall of the projecting portion that is located opposite the slot 11. Another way of allowing a lateral mounting can include that the projecting portion 3 is divided along one or two longitudinal planes, see FIG. 2d, e.g. that it is made from two distinct parts 3', 3", and that these two parts, after the cable or string has been introduced into the channel 7, are mounted to each other, e.g. using a snapping action of complimentary protrusions/recesses. If a lateral introduction of the cable into the channel 7 is not necessary, such as for ceiling lamps delivered directly from a manufacturer, the channel 7 can be a simple axial through-hole as illustrated in FIG. 2a.

The top portion 15 of the suspension device 1 can have a through-hole 17 or include some similar attachment means such as a ring or hook, for attaching it to a hook, not shown, or some similar means such as ring or shackle, projecting from a ceiling or a similar upper surface. It can also include a device for locking an electrical cable to the suspension device. Such a locking device can e.g. as illustrated comprise one or preferably at least two openings 19 through which the cable or cord can be passed. The openings can be closed or they can be the inner wider portion of recesses 21 extending from opposite edges of the top portion 15 which can be plate-shaped, i.e. have parallel large surfaces. Another means of locking the electrical cable to the suspension device will be further described with reference to FIGS. 9a and 9b.

The distant end 23 of the projecting portion 3, i.e. the free end that in use of the suspension device points in a downward direction, can have a pointed or conical shape for allowing an easy sliding of the projecting portion into the interior threading of a mating nut part, as will be described below.

Figure 3A:
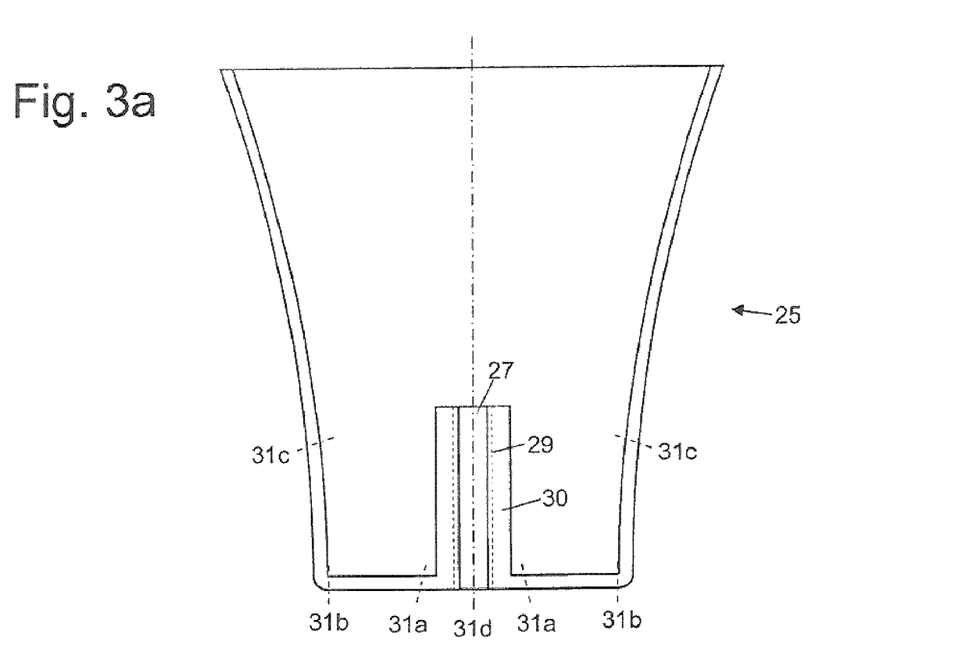
FIG. 3a is a sectional view of a ceiling cover or fitting.

The elongated, projecting portion 3 of the suspension device 1 is adapted to cooperate with a ceiling cover or fitting, generally having the reference number 25, see FIG. 3a. The ceiling cover or fitting generally has the shape of a cup or bowl, i.e. of a surface that can be curved and has a top opening or aperture which has an edge intended to come or to be in engagement with an upper surface such as a ceiling surface. The cross-section of the ceiling cover or fitting can e.g. have a symmetric shape such as a circular, square or symmetric polygon shape and it may have an asymmetric shape as to what is desired or suitable. The ceiling cover or fitting 25 has at its bottom portion a through-hole 27 that is adapted to receive, at least in the upper portion thereof, the projecting portion 3 of the suspension device 1. In particular, the through-hole can have an internal threading 29 so that the cover or fitting can be screwed onto the projecting portion as far as desired to make the cover or fitting located at a desired height or altitude, e.g. so that its top portion or top edge is engaged with, in a firm contact with or pressed against the surface of the ceiling. Also, the length of the through-hole 27 can be increased by arranging it in a part 30 projecting upwards inside the cover or fitting 25, from the bottom portion thereof so that it is not visible to a person located beneath the ceiling cover or fitting. The upwards projecting part can e.g. as illustrated have substantially the shape of circular cylinder.

The ceiling cover or fitting 25 can be adapted so that the mounting thereof can be more easily done. For that purpose the cover or fitting can be made from at least two parts. This is illustrated in FIG. 3a where alternative division surfaces are indicated at 31a, 31b and 31c, these division surfaces being concentric with the normally vertical symmetry axis of the ceiling cover or fitting 25. In another alternative the ceiling cover or fitting is divided along a vertical plane indicated at 31d as will be further described below with reference to FIG. 8.

Figure 3B:
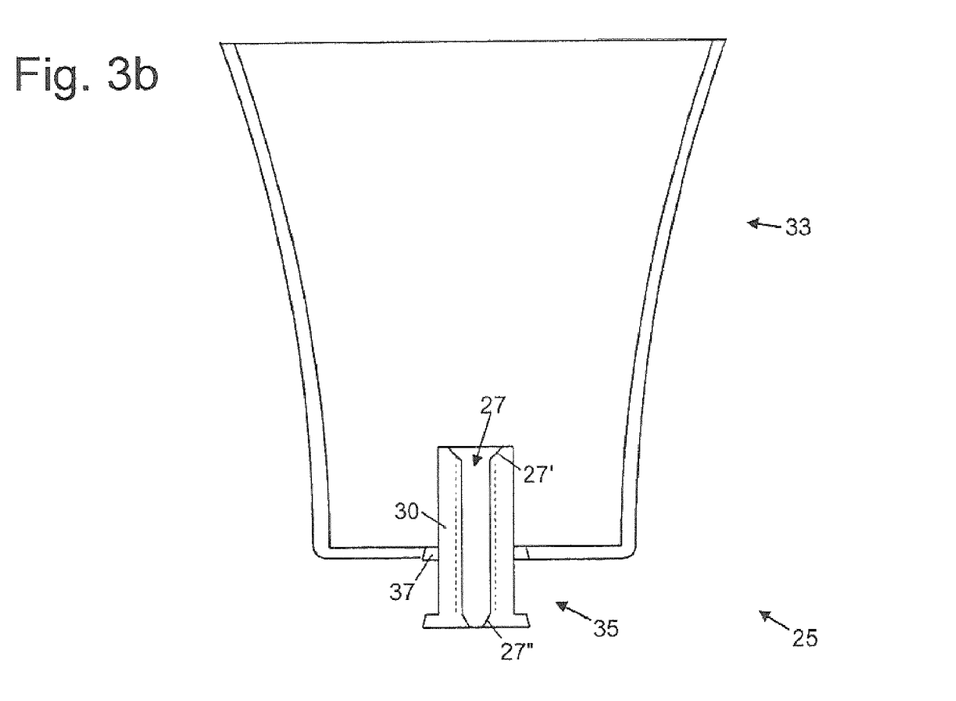
FIG. 3b is a sectional view of a ceiling cover or fitting similar to that of FIG. 3a but composed of two separate parts.

Hence, in the case where the division surface is concentric with the axis, the ceiling cover or fitting 25 comprises as seen in FIG. 3b two basic parts, a top cover 33 and a nut part 35. The top cover then has at its bottom an aperture 37 for receiving the peripheral portion of the nut part. The aperture can have such a size, i.e. width or diameter, that a connector plug of an electrical cable can be passed therethrough. The size of the aperture 37 can vary from being just enough to allow a connector plug to pass and up to a maximum size determined by the dimensions of the top cover 33. The threaded through-hole 27 in the nut part 35 can at its top end have a short tapering portion 27', i.e. be upwards widening e.g. in a conical fashion, in order to easily receive the elongated portion 3 of the suspension device 1. The through-hole can at its mouth at the bottom of the nut part have a narrowing portion 27" ending with a small opening having a diameter corresponding to or equal to to the diameter or maximum dimension of a cable, cord or string intended to pass in the channel 7 of the suspension device 1.

Figure 4A:
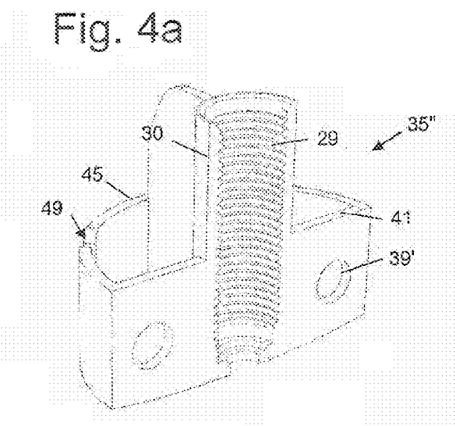
FIG. 4a is perspective view of one of two separate parts forming a nut part of a ceiling cover or fitting.
Figure 4B:
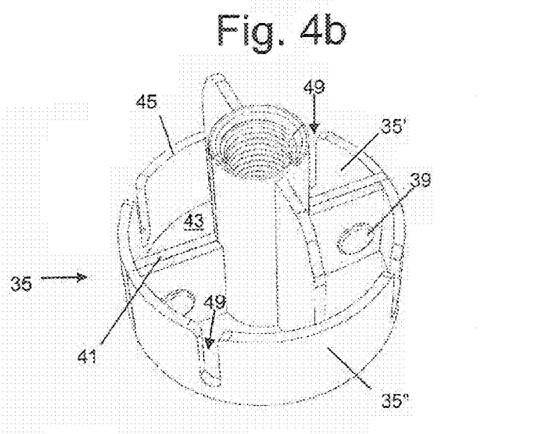
FIG. 4b is a perspective view of two assembled separate parts together forming a nut part of a ceiling cover or fitting.
Figures 4C, 4D, 4E, 4F:
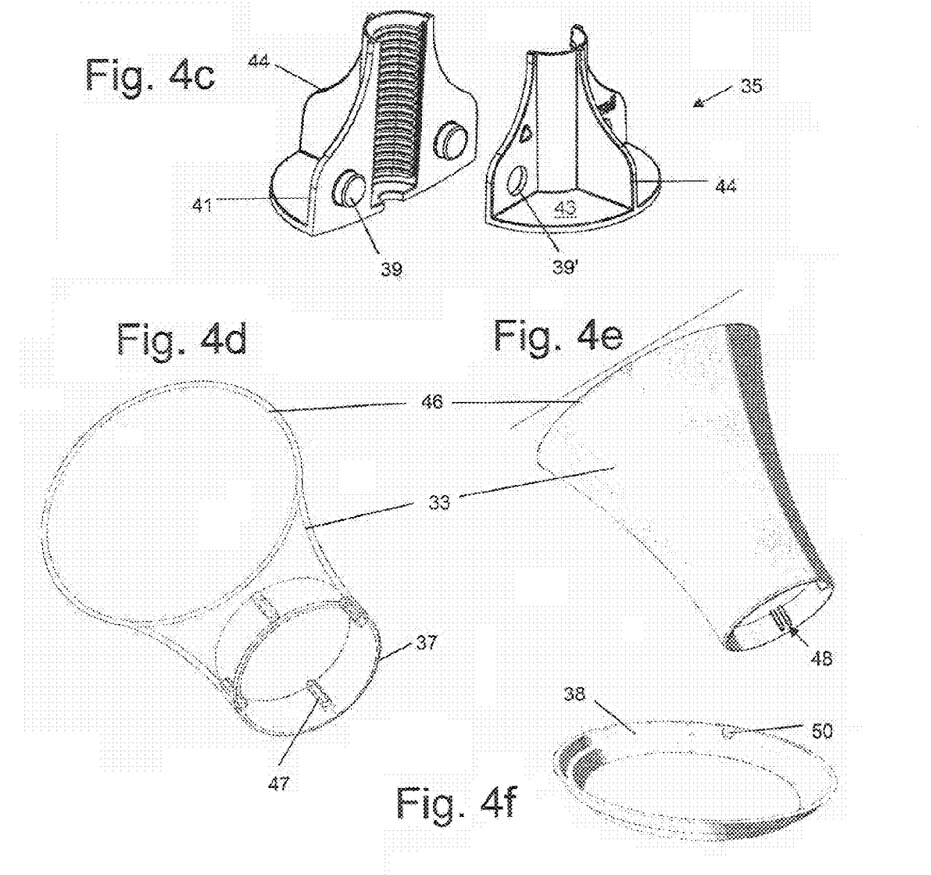
FIG. 4c is a perspective view of an alternative embodiment of two separate parts forming a nut part of a ceiling cover or fitting.
FIG. 4d is a perspective view from beneath of a top cover forming the top part of a ceiling cover or fitting.
FIG. 4e is a perspective view of an alternative embodiment of a top cover forming the top part of a ceiling cover or fitting, cooperating with the embodiment of the nut part of FIG. 4c.
FIG. 4f is a perspective view of a ring intended to be placed on top of a ceiling cover or fitting.

The nut part 35 can in turn be made from two separate parts 35', 35" as illustrated in FIGS. 4a, 4b, 4c by dividing it along a plane passing through the symmetry axis. The two separate parts can be assembled by using e.g. cooperating protrusions 39 and recesses 39' provided on the facing surfaces of the two parts. The surfaces where the two separate parts meet can as illustrated be extended by flanges 41 projecting upwards from the bottom portions 43 of the two parts corresponding to the bottom portion of the nut part 35 and also connected to portions fanning the wall of the through-hole 27, the flanges giving the two separate parts 35', 35" a higher stiffness. Also, as illustrated in FIGS. 4a and 4b, at the peripheral portion of the nut part a cylindrical flange 45 can extend upwards from the bottom portion and from the respective bottom portions 43 of the two separate parts. It can give the bottom portion a higher stiffness and can make the attachment of the nut part 35 to the top cover 33 easier. An alternative way of providing a higher stiffness is to provide, as illustrated in FIG. 4c, flanges 44 located perpendicularly to the flanges 41 and extending from the bottom portions 43 and also connected to the portions forming the wall of the through-hole 27.

The nut part 35 and the two separate parts 35', 35" thereof, when mounted together, have, at least at the bottom end nearly the same outer size as the bottom aperture 37 of the top cover 33 making the nut part fit tightly in the top cover. The nut part and the top cover can have some means to attach them to each other and to protect them from being rotated in relation to each other, such as cooperating protrusions and recesses. Thus, as seen in FIG. 4d, the top cover 33 can in the surface of 30 its bottom aperture have four opposite protrusions 47 and, see FIGS. 4a and 4b, the nut part 35 can have corresponding recesses 49 that extend downwards and are open upwards for receiving the protrusions. The recesses 49 can be made in the peripheral flanges 45 of the nut part and extend from their top edges and have diametrically evenly distributed positions in the assembled nut part 35. A single protrusion 47 and a corresponding recess can also be used, this however presupposing that some other means are arranged for defining the relative positions of the top cover 33 and the nut part. Such means can include a rib 61 or similar stops as will be described with reference to FIG. 6b. If two or more protrusions and corresponding recesses are used, they should be distributed, e.g. uniformly distributed, over the cooperating surfaces of the top cover 33 and the nut part 35. An alternative way to attach and of preventing the top cover 33 and the nut part 35 from being rotated in relation to each other is to provide, see FIG. 4e, tracks 48 on the inner surface of the bottom aperture of the top cover 33 cooperating with the outer portions of the flanges 44 shown in FIG. 4c. Each of the tracks 48 can for example be formed by two parallel ribs as illustrated. This to embodiment can be combined with two or more stops or a rib 61 as shown in FIG. 6b to define the nut part's relative position to the top cover 33.

Figure 5A:
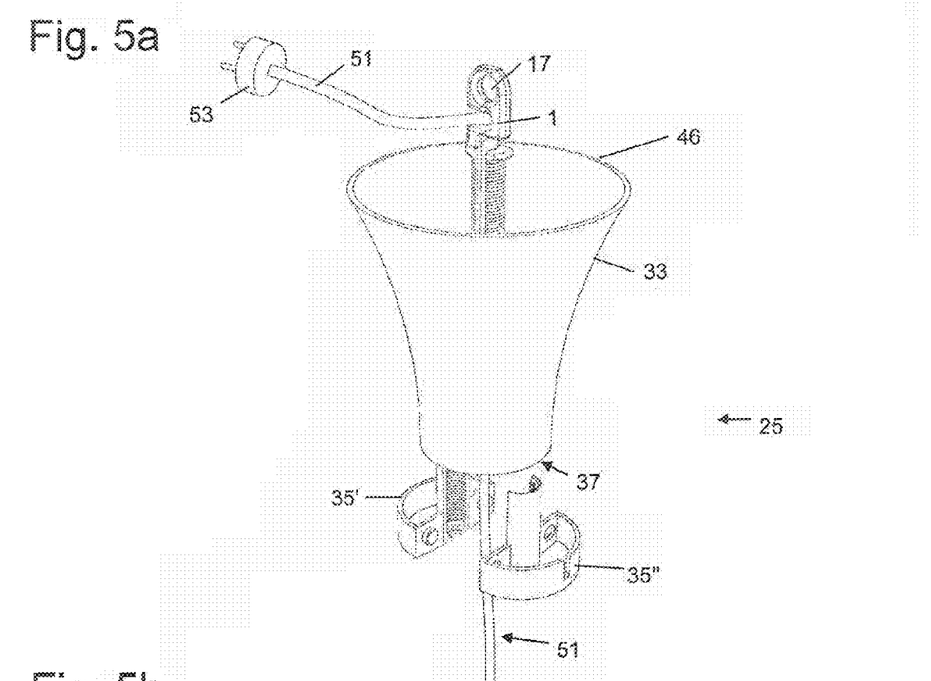
FIG. 5a is a perspective exploded view of a complete ceiling suspension assembly.
Figure 5B:
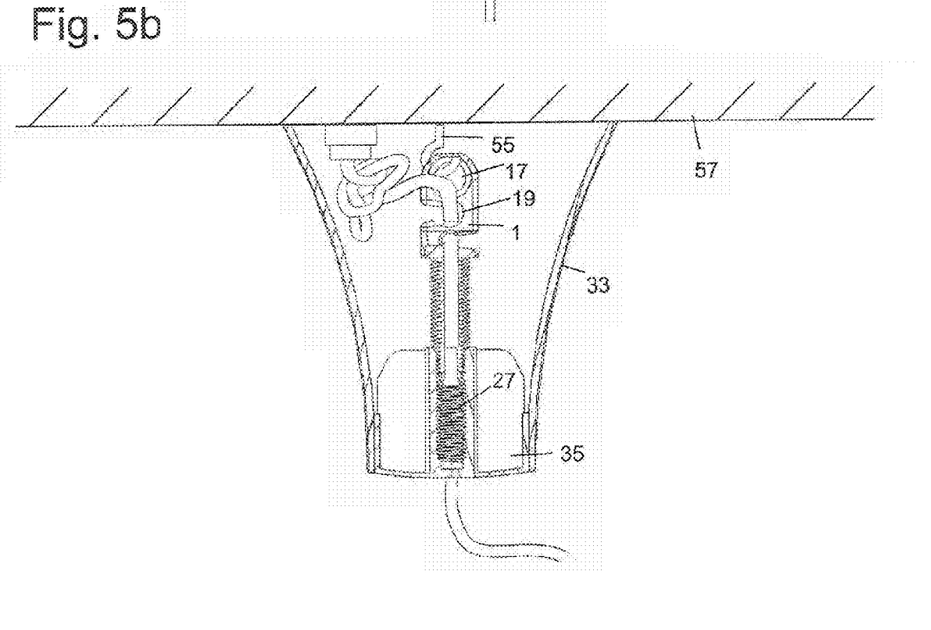
FIG. 5b is a cross-sectional view of the ceiling suspension assembly of FIG. 5a when mounted to a ceiling.

The assembly and use of the ceiling cover or fitting appears from FIGS. 5a and 5b. The ceiling portion of an electrical cable 51 and its connector plug 53 or similar electrical connector are introduced from below, through the aperture 37 to extend through the top cover 33. A portion of the cable is pressed into the channel 7 of the suspension device 1 and another portion into the openings 19 to securely lock the cable. The suspension device can be hung from the ceiling by introducing a hook 55 or similar ring or shackle combined e.g. with an S hook that is attached to the ceiling indicated 57 into the opening 17 of the top portion 15 of the suspension device. The two separate parts 35', 35" of the nut part are attached to each other by fitting their adapted protrusions and recesses to each other to enclose, in the through-hole 27, a portion of the cable 51 located below the top cover 33. The now assembled nut part is fitted into the lower aperture 37 of the top cover 33. Then the recesses 49 receive the protrusions 47 or alternatively the protrusion tracks 48 receive the flanges 44 as described with reference to FIGS. 4a and 4d or 4c and 4e above. The complete ceiling cover or fitting is raised along the cable 51 so that the through-hole of the nut part, in its upwards prolonged portion 30, is made to receive the projecting portion 3 of the suspension device 1. The mating threadings 29 and 5 of the two parts then become engaged with each other and the two parts are attached to each other by rotating the complete ceiling cover or fitting, such as by holding it in the top cover 33 with the hands of the person mounting the ceiling cover or fitting. In the rotating movement the ceiling cover or fitting is more and more elevated, so that finally the upper edge 46 of the top cover 33 comes in contact with the surface of the ceiling 57 and can be sufficiently pressed against it to give the ceiling cover or fitting a final position in which it is firmly or tightly engaged with the ceiling in a neat way, without any space left between its upper edge and the ceiling and completely hiding the electrical cable 51, the suspension device 1 and ceiling hook 55 and possibly also the plug/connector 53.

If an electrical socket or outlet, not shown, that is to be used to connect the appliance to be suspended is located at a distance from the location where the suspension device is to be hung and thereby requires that the electrical cable runs along the ceiling which prevents the ceiling cover or fitting from coming in contact with the ceiling along all of its upper edge, a separate ring 38 as illustrated in FIG. 4f can be used at the upper edge 46 of the top cover 33, having an indentation 50 at the upper edge of the ring to allow the passage of the cable. By using such a ring having an indentation, it is still possible to achieve a tight fit between the ceiling cover or fitting and the ceiling surface. The ring 38 can have a smooth surface at the outer side of its bottom edge 36 which to when inserted into the ceiling cover or fitting from above is cooperating with a smooth inner surface at the top edge 46 of the ceiling cover or fitting, i.e. of the top cover 33 in the case illustrated, or vice versa. Thereby, the cover or fitting can simply slide on the ring which can then sit still and fixate the cable, cord or string in the ceiling while the ceiling cover or fitting can be rotationally screwed upwards along the cooperating threadings of the projecting portion 3 and the nut part 35 until it reaches a tight fit between the ceiling cover or fitting and the ring 38 which in turn reaches a tight fit to the ceiling.

When dismounting the ceiling cover or fitting, the ceiling cover or fitting is rotated in the opposite direction, thereby unscrewing the nut part 35 from the suspension device 1, and then, after a sufficient unscrewing movement, the suspension device 1 can be lifted away from the hook 55 or it can be unscrewed until the complete ceiling cover 25 is released from the suspension device. Mounting and dismounting can easily be performed many times without causing any damage to the ceiling cover or fitting, the suspension device, the ceiling or the cable, cord or string.

If the lower aperture 37 of the top cover 33 is too narrow, see FIG. 3b, or the ceiling cover or fitting is manufactured as a single unit such as illustrated in FIG. 3a, it may not be possible to pass the electrical connector 53 therethrough. The connector plug then must first be dismounted from the cable 51, the cable then passed through the opening 37 or through-hole 27 and finally the connector plug is remounted on the top side of the ceiling cover or fitting. The same applies in those cases where the nut part 35 is not divided in two horizontally separate parts, see FIG. 7a, and where the downward projecting portion 3 has no means for laterally introducing the cable, see FIG. 2a. In all these cases a secure suspension of the object to be suspended is nevertheless obtained since the tight suspension to the ceiling is not dependent on a safe attachment of the ceiling cover or fitting to the electrical cable, cord or string, but the ceiling cover or fining is instead secured tightly to the ceiling through the suspension device 1 cooperating with a ceiling hook 55 or similar device.

The ceiling fitting or cover 25 or at least the exterior, visible portions thereof may be made from various materials such as polymers, glass, metal and wood. The suspension device 1 can e.g. be of suitable polymer and also the interior part of the ceiling fitting or cover in which the channel 27 passes and the thread 29 is made.

Various alternative embodiments have been mentioned above. As is obvious to anyone skilled in the art the details of the suspension assembly can be combined and configured in a plurality of ways.

Figure 6A:
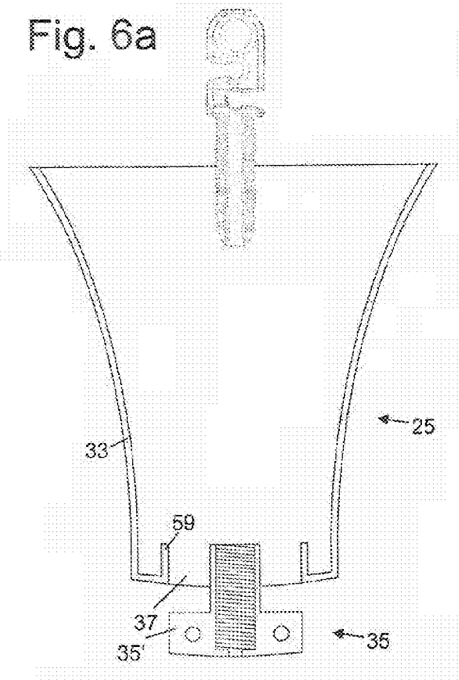
FIGS. 6a and 6b are cross-sectional views of two alternative embodiments for dividing, at its bottom or lower portion, a ceiling suspension assembly in two separate parts.
Figure 6B:
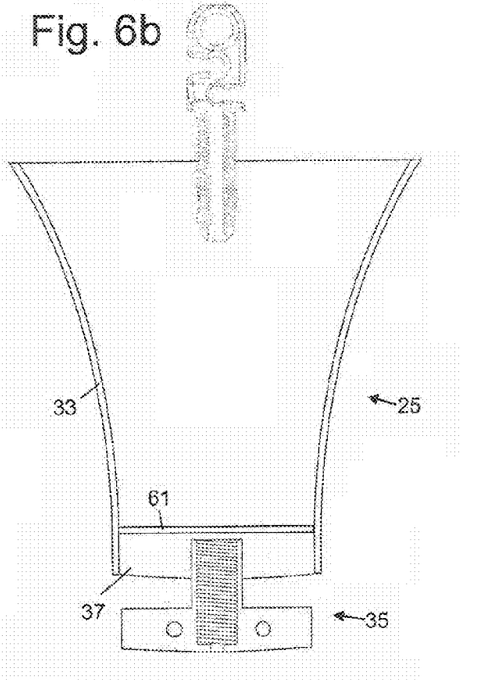

Thus, in the embodiment of FIG. 6a the ceiling cover or fitting 25 substantially corresponds to that illustrated in FIG. 3b but here the nut part 35 is composed of two separate parts as illustrated in FIGS. 4a, 4b and 4c. The aperture 37 for receiving the nut part has a diameter smaller than that of the bottom portion of the top cover 33. Vertical flanges 59 can extend from said bottom portion at the edge of the aperture to stabilize the aperture and the flanges can have protrusions, not shown, corresponding to the protrusions 47 illustrated in FIG. 4d for cooperation with recesses such as 49 made in the nut part 35 or corresponding flanges 44 and tracks 48 so that the nut part and the top cover can be rotationally connected and the nut part is given a definite position in relation to the top cover.

In the embodiment of FIG. 6b that substantially corresponds to that of FIGS. 4a, 4b and 4d the top cover 33 has instead of or in addition to the protrusions 47 either a horizontal rim or bead 61 on its interior surface or alternatively dispersed stops, not shown, that together form a rim to receive the bottom portion 43 of the nut part 35 as in the embodiment of FIG. 4c. The bead or stops is/are placed so that the nut part when introduced into the lower aperture 37 will have its peripheral portion 45 or the ribs forming the tracks 48 and/or additional ribs come in contact with the lower side of the bead or stops, thereby stopping a further introductory movement, this giving the nut part a well-defined position in relation to the top cover 33. This may be particularly suitable in those cases where the cross-sectional shape of the ceiling cover or fitting is polygonal or asymmetric and generally where no special means such as cooperating protrusions and recesses are required in order to make the top cover 33 and the nut part 35 to rotate together when assembled. Another alternative, not shown, for stopping a further introductory movement of the nut part into the top cover is to have a bottom portion 43 that is wider than the size of the lower aperture 37 of the top cover, not making it possible to introduce the nut part 35 into the top cover 33 further than desired. This alternative can also be suitable in relation to add-on covers or fittings as is further described in relation to FIG. 10a.

Figure 7A:
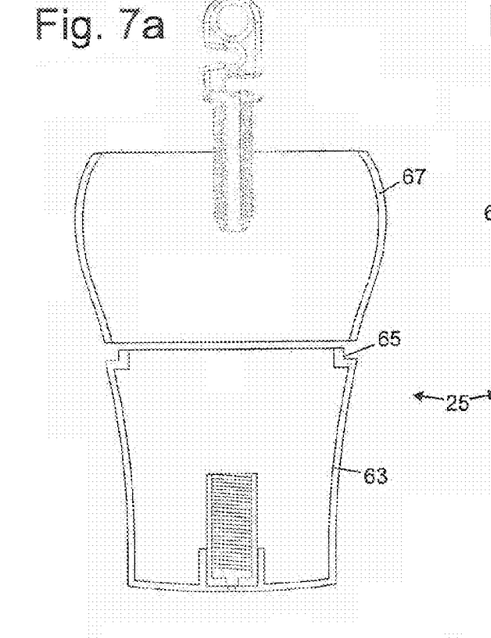
FIGS. 7a and 7b are cross-sectional views of two alternative embodiments for dividing, at a portion located closer to the ceiling, a ceiling suspension assembly in two separate parts.
Figure 7B:
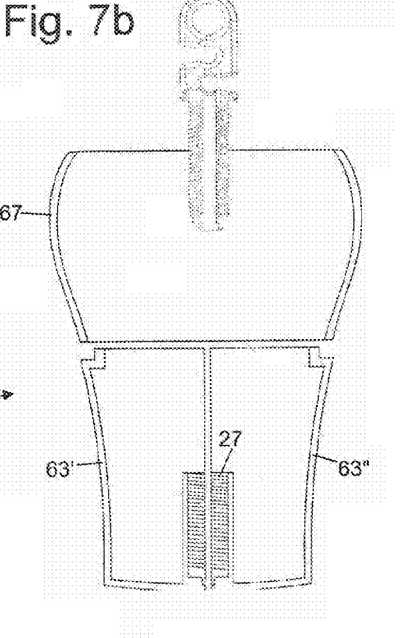

The ceiling cover or fitting 25 illustrated in FIG. 7a is divided along a substantially horizontal plane corresponding to the division surface 31c of FIG. 3a. The bottom cover part 63 then has peripheral sides extending some distance upwards and terminating in an upper margin portion forming a recess 65 for receiving the lower edge of the top cover portion 67. Since the bottom cover part in this case is a single unit, the electrical connector of an electrical cable cannot be passed therethrough but has to be dismounted before introducing the electrical cable through the channel 27. In order to allow an electrical connector to be passed the bottom cover part 63 can be made from two separate parts 63', 63" as seen in FIG. 7b, the two parts formed by dividing the bottom cover part along a vertical axial plane. After having introduced an electrical cable in the spaces of the two parts forming the channel 27 the two parts are joined using e.g. mating protrusions and recesses, not shown.

Figure 8:
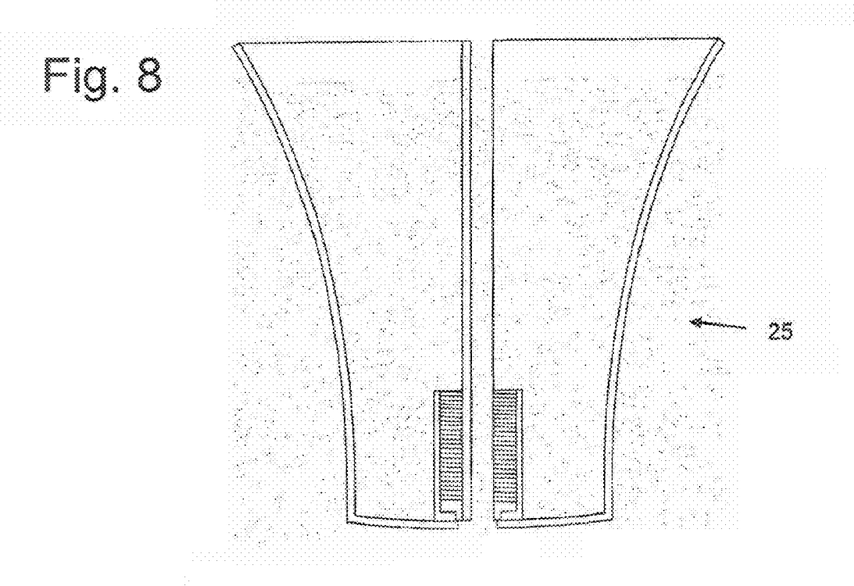
FIG. 8 is a cross-sectional view of a ceiling fitting, casing or cover divided in two separate parts along vertical plane.

A ceiling cover or fitting 25 that is divided along a vertical plane is illustrated in FIG. 8, this case corresponding to the division line 31d of FIG. 3a. The two separate parts can be joined using e.g. mating protrusions and recesses, not shown, in the same ways as mentioned above.

Figure 9A:
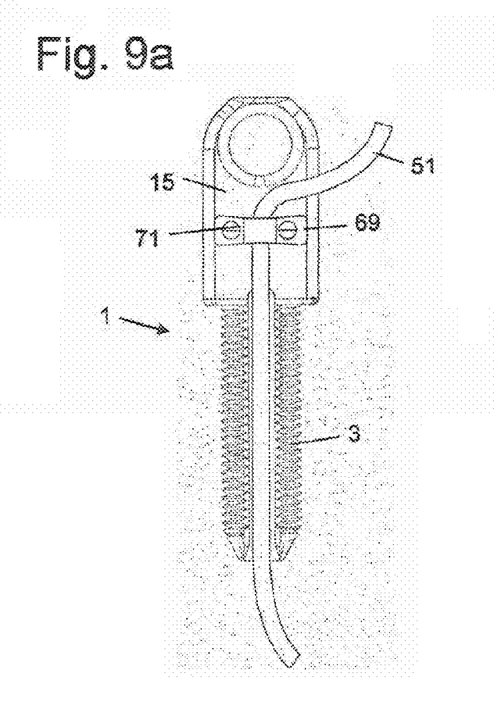
FIGS. 9a and 9b are side views of a suspension device having alternative embodiments of means for locking an electrical or non electrical cable, cord or string.
Figure 9B:
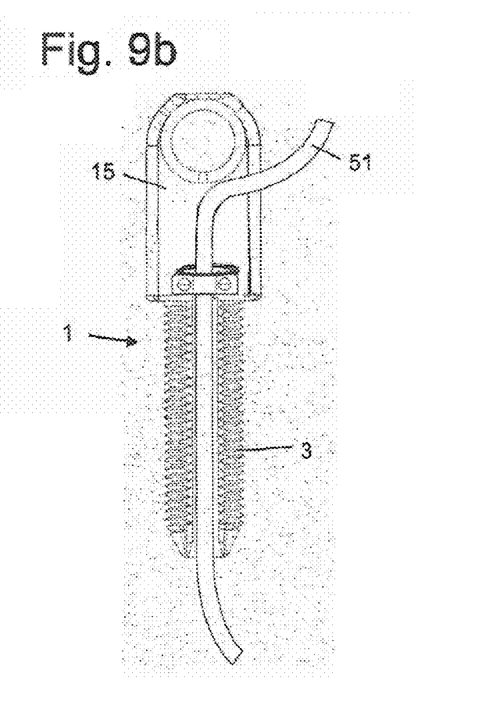

The device for blocking the electrical cable or cord, i.e. for attaching securely the cable or cord to the suspension device 1, can also be made in various ways. As seen in FIG. 9a the cable 51 can be is securely attached by a bridge part 69 pressed against the cable by screws 71 screwed into the top portion 15 of the suspension device. Alternatively, two such cooperating bridge parts can be pressed against each other having the electrical cable therebetween using screws and nuts, not shown, the two assembled bridge parts being supported by the upper surface of the projecting portion 3 when the suspension device is hung on a ceiling hook (55), see FIG. 9b.

Figure 10A:
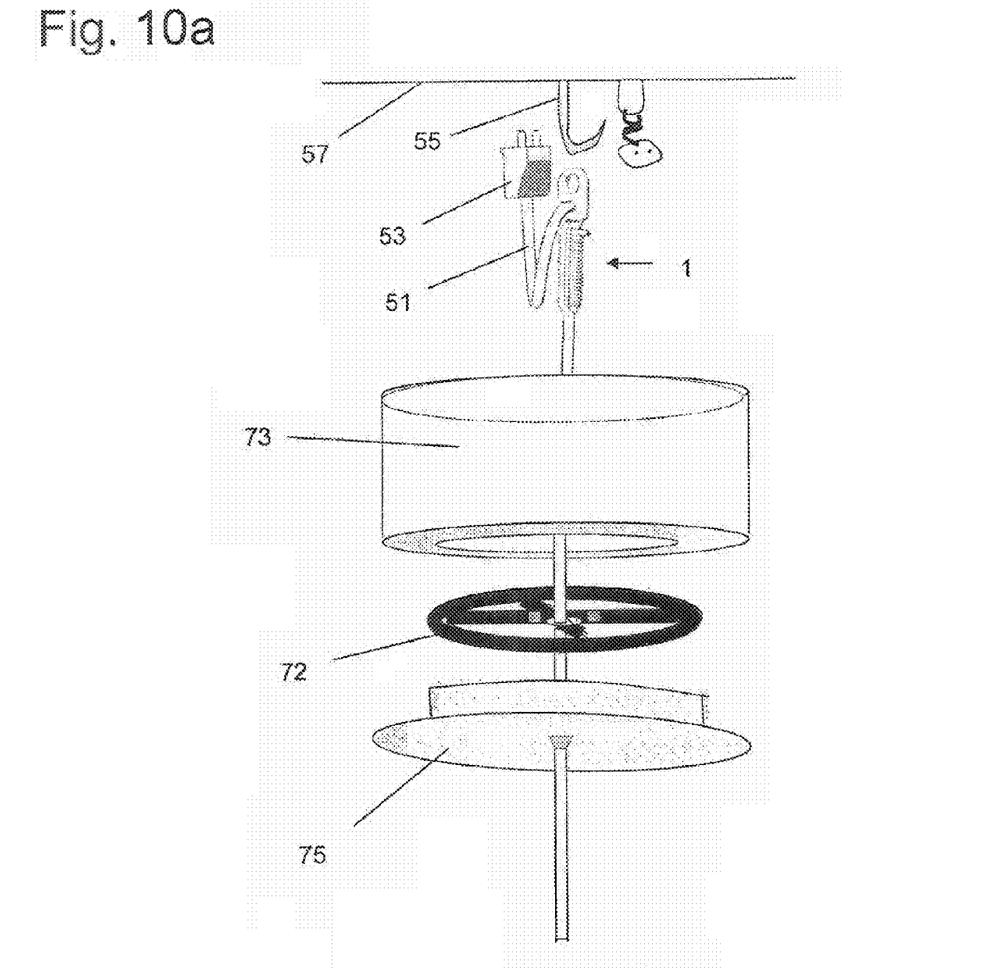
FIG. 10a is a perspective view of a complete ceiling suspension assembly used as an add-on device for an external lamp cover or fitting.
Figure 10B:
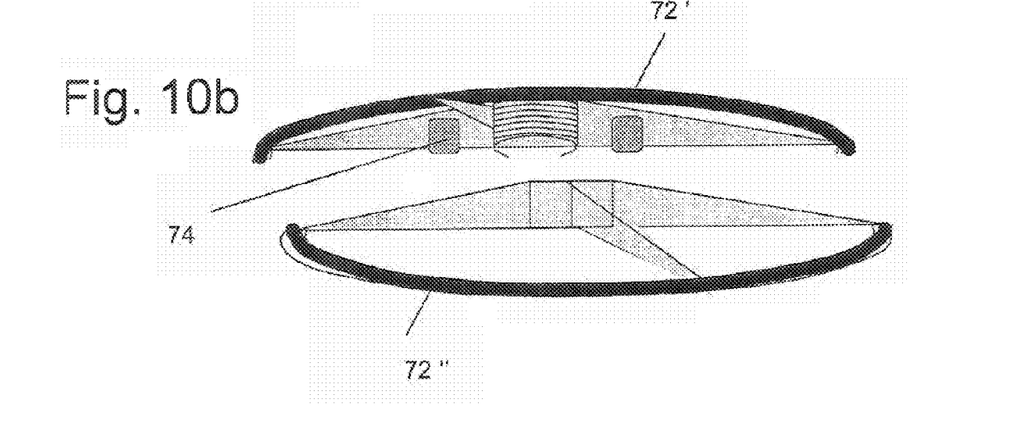
FIG. 10b is a perspective view of a nut part cooperating with the add-on assembly of FIG. 10a, FIGS. 10c and 10d are a perspective view and a cross-sectional view, respectively, of a complete ceiling suspension assembly used with a ceiling platform in a sloping ceiling.

The ceiling suspension assembly as described above can also be used in similar application areas, e.g. as an add-on ceiling cover or fitting, together with a ceiling platform for sloping ceilings or in relation to a blind cover or another object to be hung from a ceiling but where no cord is involved or visible. As illustrated in FIGS. 10a, 10b, an add-on ceiling cover or fitting 73 can be used in order to create more room for e.g. a hook 55, an electrical contact plug 53 and a remaining piece of a cord 51 to reach a tight engagement with the ceiling 57. Said add-on ceiling cover or fitting can be attached to the ceiling in the same way as described above, where the nut part 72 is attached to the add-on ceiling cover or fitting 73 either by cooperating flanges and tracks, not shown, in the nut part 72 and on the interior side of the add-on ceiling cover or fitting 73, or simply by having a larger diameter than the lower aperture of the add-on ceiling cover or fitting 73 and with means to protect them from being rotated in relation to each other. The nut part 72 can be composed of two parts 72' and 72" to make it easy to mount and dismount without having to cut the cord and they should have means for releasably attaching them to each other, e.g. cooperating protrusions and recesses or by arranging hooks 74 on one 72' of the two parts to be fastened from below to the other 72" of the two parts. After assembly around the cord 51, the nut part 72 can be screwed onto the suspension device 1 by a rotational movement, thereby pressing the add-on ceiling cover or fitting 73 to the ceiling 57. The external lamp cover 75 now released from pressure from connector, suspension, remaining cord, socket etc. can thereafter be pressed towards and attached to the add-on ceiling cover or fitting 73. Similar use of the ceiling suspension assembly in FIG. 10a can be reached in relation to a vertically divided add-on cover or fitting similar to the ceiling covers or fittings shown in FIG. 7b or FIG. 8, where the external lamp cover can be attached to the bottom part of the vertically divided add-on cover or fitting.

Figures 10C, 10D:
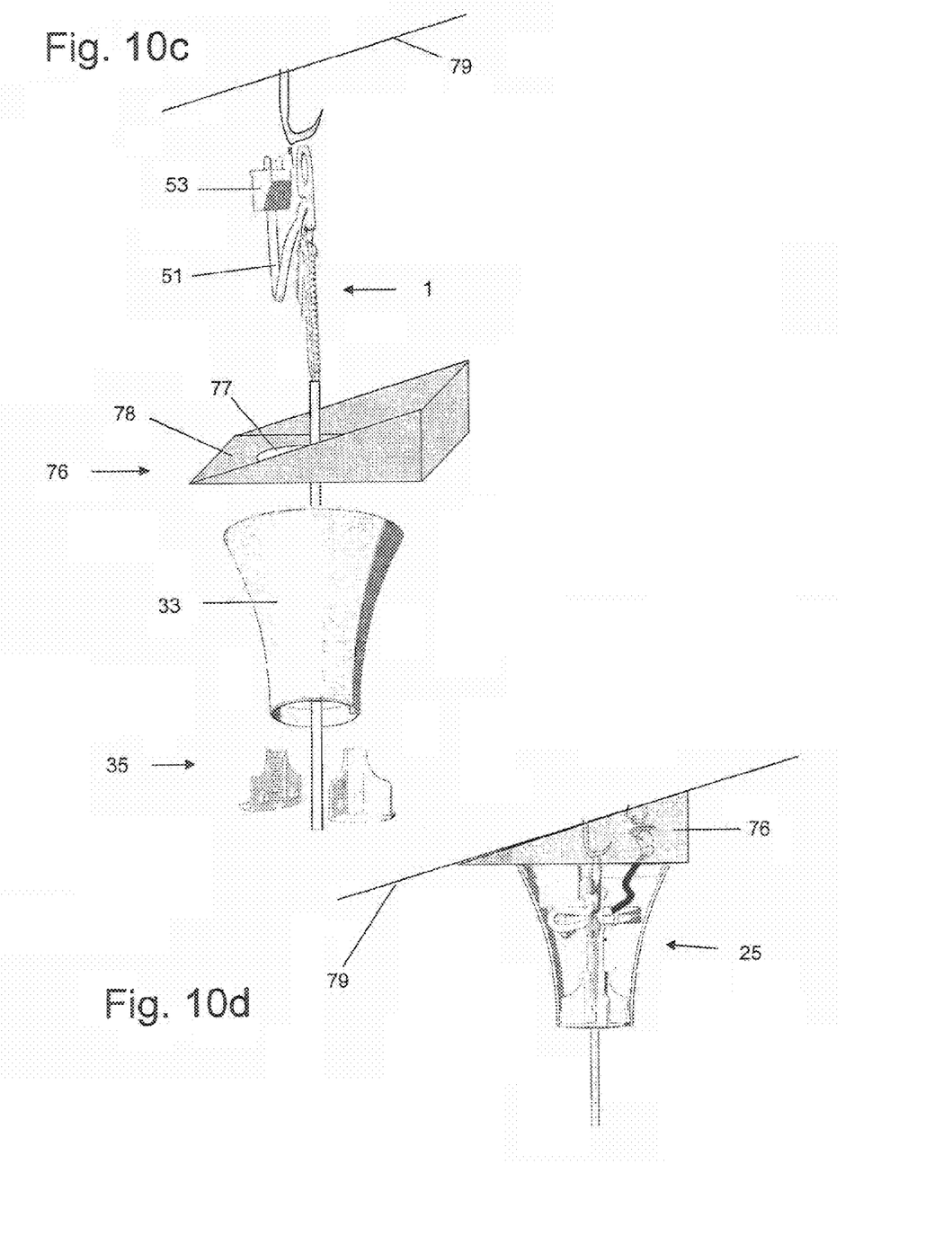

Another use is illustrated in FIGS. 10c, 10d, where a horizontal plane is created in a sloping or oblique, i.e. non-horizontal, ceiling 79. The suspension device 1 can here be longer and a ceiling platform 76 can be mounted in between the ceiling cover or fitting 33 and the ceiling. The ceiling platform has upper edges adapted to come in contact with the ceiling, the bottom surface of the ceiling platform then being substantially horizontal, when the ceiling suspension assembly is installed. The bottom surface of the ceiling platform 76 may suitably have a size adapted to the size of the upper edge of the top cover 33 so that it covers the upper opening of the ceiling cover or fitting and is in contact with the whole upper edge thereof. The ceiling platform can have the general shape of a wedge, e.g. as illustrated in the figures a box that is open upwards, i.e. a rectangular box that is obliquely cut at its top, having a sloping plane extending through the upper edges of the box. Thus, the bottom surface can be rectangular and then two surfaces extend upwards from two opposite sides of the rectangular shape. These surfaces have upper edges sloping in relation to their lower edges where they connect to the bottom surface, the slope being adapted to the slope of the ceiling 79. The opposite surfaces can have the shape of rectangular triangles as shown. Another surface can extend from one of the two remaining sides of the rectangular bottom surface, this surface also being connected to edges of the two opposite surfaces. A large aperture 77 through the bottom part 78 of the ceiling platform 76 makes it possible to pass a cable 51 with a contact plug 53 therethrough without having to dismount the contact plug. The nut part 35 of the ceiling cover or fitting is inserted into the top cover 33 and rotationally attached to the longer suspension device 1 and the ceiling cover or fitting 25 can be screwed until it is in tight engagement with the ceiling platform 76, making the ceiling platform come in tight engagement with the sloping ceiling 79.

Figure 10E:
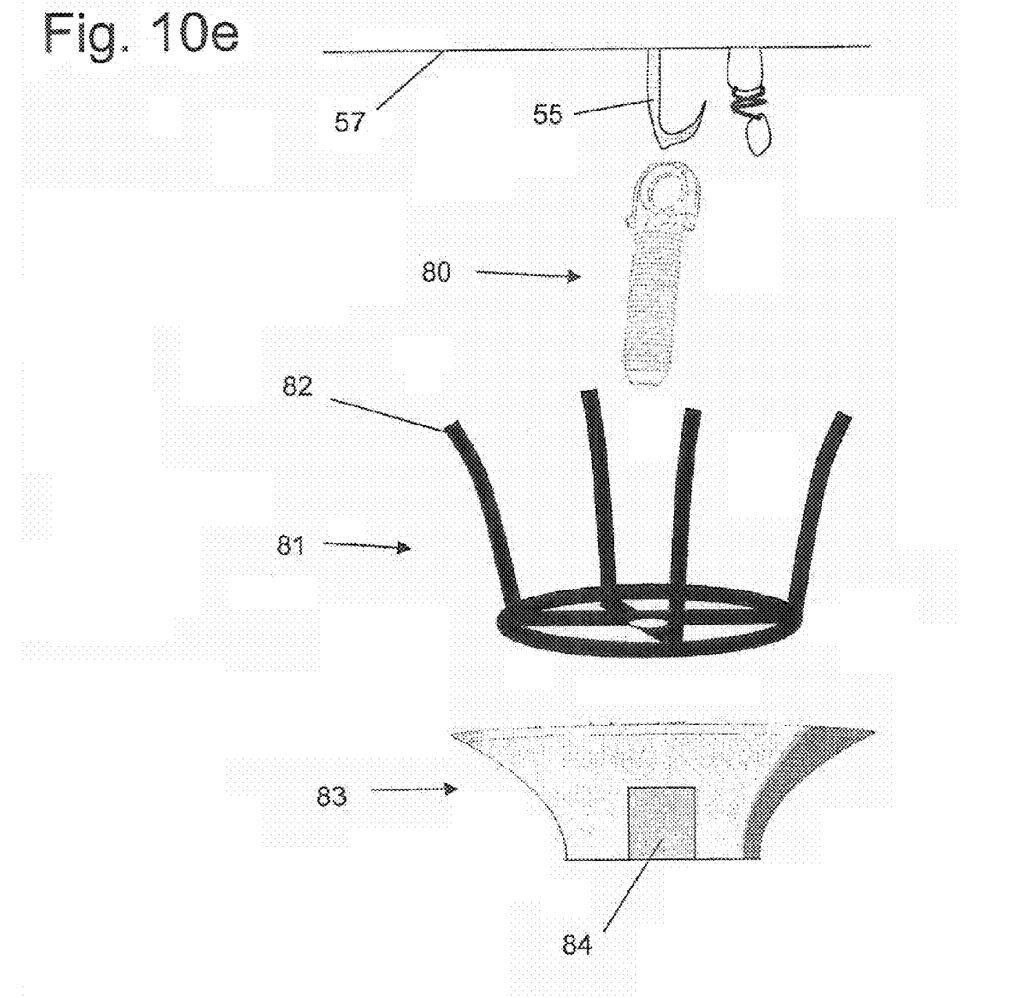
FIG. 10e is a perspective view of a complete ceiling suspension assembly used for objects to be hung in a ceiling but where no cable cord or string is involved or visible from the outside.

Another example of use is illustrated in FIG. 10e where an object having no visible cable, cord or string, e.g. a blind cover, is to be hung from or attached to a ceiling and where a tight engagement with the ceiling is required. In this case, a suspension device 80 or similar screw which does not need to have an axial channel is hung on the hook 55 or similar ceiling suspension. The suspension device may otherwise have the same general design as the suspension device 1 described above. Thus it can have an elongated portion projecting downwards and provided with an exterior threading. An intermediate part 81 having a central hole can be vertically moved along the projecting portion through a rotational movement, with the projecting portion in the hole, to be fastened to the projecting portion. For this purpose the hole may e.g. be threaded so that it can be screwed onto the projecting portion or it may only have some elastic protrusions cooperating with the threading. The intermediate part 81 can include elongated members or arms 82 that can be elastic and extend upwards from a bottom portion where the hole is placed. When the intermediate part has been sufficiently moved upwards along the projecting portion, the elongated members 82 will press against the surface of the ceiling, this creating a downward force on the projecting portion that can help make the suspension device 80 stay on the hook 55 or similar device and in a desired relative position to the ceiling 57 when installing the assembly. A ceiling cover 83 e.g. a blind cover can be generally designed as the cover 25 described above but having no or a very small lower aperture or opening at its bottom. Thus, it can have a part 30 projecting upwards inside the cover or fitting 25, from the bottom portion thereof so that it is not visible to a person located beneath the ceiling cover or fitting. The upwards projecting part can e.g. as illustrated have substantially the shape of circular cylinder and can have an interior threading, not shown, so that it can be screwed onto the suspension device 80. The ceiling cover or fitting 25 can be adapted so that the mounting thereof can be more easily done. For that purpose the upwards projecting portion can be upwards widening to easily meet and be rotationally mounted onto the projecting portion 80, which distant end can for the same purpose be shaped in a conical way, and which in turn is being held in position by the intermediate part 81, until the cover comes in a tight engagement with the ceiling 57. The blind cover can in this way conceal the ceiling suspension hook, a ceiling outlet and/or similar devices.

It is obvious that an intermediate part 81 as described above also can be used in other designs described above to assist in maintaining the suspension device 80 on the hook 55 when mounting the suspension assembly.

It should be understood herein and in the claims hereof that such terms as "top", "bottom", "upper", "lower", "up", "down" and the like have been used for illustration purposes only, in order to provide a clear and understandable description and claiming of the invention. Such terms are not in any way to be construed as limiting and should be understood in the meaning of the intended use of the ceiling fitting as being used hanging from a ceiling or a similar upper surface, normally a mainly horizontal and flat ceiling that however in special cases can be oblique or tilted and/or have other shapes.

The invention claimed is:

1. A ceiling suspension assembly for hanging an object in a cable, cord or string from a ceiling, the assembly comprising a ceiling fitting, cover or casing and a suspension device,
   the suspension device adapted to be attached to the ceiling and comprising a projecting elongated portion having an axial channel for receiving the cable, cord or string, the projecting elongated portion having an exterior threading, and
   the ceiling fitting, cover or casing comprising a portion having a through-hole with an interior threading for cooperation with said exterior threading to allow, by rotating the ceiling fitting, cover or casing to take a desired position along the projecting elongated portion such as for pressing an upper edge of the ceiling fitting, cover or casing against the ceiling or for making an upper edge of the ceiling fitting, cover or casing to be in engagement with the surface of the ceiling, not leaving any substantial space between said upper edge and the surface of the ceiling, wherein
   the projecting elongated portion has a longitudinal opening into the axial channel extending at least over that part of the elongated projecting portion that carries the exterior threading for allowing a portion of the cable, cord or string to be laterally introduced into the axial channel, and
   the ceiling fitting, cover or casing is composed of two separate parts, a nut part and a top cover,
      the nut part including a portion having a through-hole that has an interior threading, and
      the top cover having an opening for receiving the nut part, means being provided for attaching the top cover and the nut part to each other, and
      the nut part being divided along a vertical axial plane to be composed of two separate parts, each of the two separate parts including a portion of the wall of the through-hole and its interior threading and the two separate parts having means for releasably attaching them to each other, so that the longitudinal opening in the projecting elongated portion, the opening in the top cover; and the division of the nut part into two separate parts allow an easy enclosure and mounting of the electrical cable, cord or string having a connector plug, and thereby allow an object to be hung from a ceiling without having to dismount the connector plug from the electrical cable, cord or string.

2. A ceiling suspension assembly according to claim 1, wherein the longitudinal opening of the projecting elongated portion is narrower than the channel inside said projecting elongated portion, not allowing the cable, cord or string to laterally come out of the channel.

3. A ceiling suspension assembly according to claim 1, wherein the ceiling fitting, cover or casing comprises a vertical elongated portion which is divided along a vertical plane and which extends from a bottom portion of the ceiling fitting, cover or casing upwards into the interior of the ceiling fitting, cover or casing and in which the through-hole having an interior threading passes.

4. A ceiling suspension assembly according to claim 1, wherein the end of the suspension device is made in a coned shape, and a top end of the elongated portion in the ceiling fitting, cover or casing is upwards widening i.e. has the shape of a funnel, so that these parts can easily engage inside the ceiling fitting, cover or casing, allowing an easy mounting of the ceiling suspension assembly.

5. A ceiling suspension assembly according to claim 1, wherein the nut part has a peripheral vertical flange for engagement with an interior surface of said opening in the top cover, an exterior side of a flange and the interior surface having mating recesses and protrusions or cooperating flanges and tracks that give the nut part a definite position in relation to the top cover and for rotatably attaching them to each other.

6. A ceiling suspension assembly according to claim 1, further comprising a separate ring attachable or mountable to an upper edge of the ceiling fitting, cover or casing.

7. A ceiling suspension assembly according to claim 6, wherein the separate ring has an indentation or recess at its upper edge to allow the passage of the cable, cord or string.

8. A ceiling suspension assembly according to claim 6, wherein the separate ring has a smooth surface at its lower edge cooperating with the upper edge of the cover so that it can stay still while the ceiling fitting, cover or casing is being rotatably mounted on the projecting portion.

9. A ceiling suspension assembly according to claim 1, wherein the ceiling fitting, cover or casing and the nut part are used as intermediate parts and are mounted between an external ceiling cover and the ceiling, the ceiling fitting, cover or casing having upper edges coming in contact with the ceiling when the ceiling suspension assembly is installed, a bottom surface having a width which is larger or same as the width of the upper edge of the external ceiling cover and having a large aperture making it possible to pass the cable, cord or string with a contact plug therethrough.

10. A ceiling suspension assembly according to claim 1, for use with sloping or oblique ceilings, further comprising a ceiling platform to be mounted between the external ceiling cover or fitting and the ceiling, the ceiling platform having upper edges coming in contact with a sloping or oblique ceiling when the ceiling suspension assembly is installed and a bottom surface then being substantially horizontal, the bottom surface having a size adapted to the size of the upper edge of the top cover and having a large aperture making it possible to pass the cable, cord or string with a contact plug therethrough.

11. A ceiling suspension assembly for hanging an object and a cable, cord or string from a ceiling or upper surface, the assembly comprising a ceiling fitting, cover or casing and a suspension device,
the suspension device adapted to be attached to the ceiling and comprising a projecting elongated portion having an axial channel for receiving the cable, cord or string, the projecting elongated portion having an exterior threading, and
the ceiling fitting, cover or casing comprising a portion having a through-hole with an interior threading for cooperation with said exterior threading to allow, by rotating the ceiling fitting, cover or casing to take a desired position along the projecting elongated portion such as for pressing an upper edge of the ceiling fitting, cover or casing against the surface of the ceiling or for making an upper edge of the ceiling fitting, cover or casing to be in engagement with the surface of the ceiling, not leaving any substantial space between said upper edge and the surface of the ceiling, wherein
the projecting elongated portion has a longitudinal opening into the axial channel extending at least over that part of the elongated projecting portion that carries the exterior threading for allowing a portion of the cable, cord or string to be laterally introduced into the axial channel, and
the ceiling fitting, cover or casing is divided along a vertical plane, so that it is composed of two separate parts, where each of the two separate parts include a portion of the wall of the through-hole and its interior threading and the two separate parts having means for releasably attaching them to each other,
so that the longitudinal opening in the projecting elongated portion and the vertical division of the ceiling fitting, cover or casing into two separate parts allow an easy enclosure and mounting of the electrical cable, cord or string having a connector plug or similar object at one end, and thereby allowing an object to be hung from a ceiling without having to dismount the connector plug or similar from the electrical cable, cord or string.

12. A ceiling suspension assembly according to claim 11, wherein the longitudinal opening of the projecting elongated portion is narrower than the channel inside said projecting elongated portion, not allowing the cable, cord or string to laterally come out of the channel.

13. A ceiling suspension assembly according to claim 11, wherein the ceiling fitting cover or casing comprises a vertical elongated portion which is divided along a vertical plane and which extends from a bottom portion of the ceiling fitting, cover or casing upwards into an interior of the ceiling fitting, cover or casing and in which the through-hole having an interior threading passes.

14. A ceiling suspension assembly according to claim 11, wherein an end of the suspension device is made in a coned shape, and the top end of the elongated portion extending upwards in the the divided ceiling fitting, cover or casing is upwards widening i.e. has the shape of a funnel, so that these parts can easily engage inside the ceiling fitting, cover or casing, allowing an easy mounting of the ceiling suspension assembly.

15. A ceiling suspension assembly according to claim 11, further comprising a separate ring attachable or mountable to an upper edge of the ceiling fitting, cover or casing.

16. A ceiling suspension assembly according to claim 15, wherein the separate ring has an indentation or recess at its upper edge to allow the passage of a cable, cord or string.

17. A ceiling suspension assembly according to claim 15, wherein the separate ring has a smooth surface at its lower edge cooperating with the upper edge of the cover so that it can stay still while the ceiling fitting, cover or casing is being rotatably mounted on the projecting portion.

18. A ceiling suspension assembly according to claim 11 for use with external ceiling covers, wherein the vertically divided ceiling cover or fitting with its portion of the wall of the through-hole and its interior threading is used as an intermediate part and is mounted between an external ceiling cover and the ceiling, the ceiling cover or fitting having upper edges coming in contact with the ceiling when the ceiling suspension assembly is installed, the bottom surface having a width which is larger or same as the width of the upper edge of the external cover and the cover being divided along a vertical plane making it possible to mount a cable, cord or string with a contact plug or similar object at one end without having to cut the cable, cord or string.

19. A ceiling suspension assembly according to claim 11, for use with sloping or oblique ceilings, further comprising a ceiling platform to be mounted between the ceiling cover or fitting and the ceiling, the ceiling platform having upper edges coming in contact with a sloping or oblique ceiling when the ceiling suspension assembly is installed and a bottom surface then being substantially horizontal, the bottom surface having a size adapted to the size of the upper edge of the cover and having a large aperture making it possible to pass a cable, cord or string with a contact plug or similar object therethrough.

20. A ceiling suspension assembly for an object that is to be hung from or attached to a ceiling, in particular for an object having no cable, cord or string such as a blind cover, for concealing a ceiling suspension hook, a ceiling outlet or devices mounted in a ceiling, comprising a suspension device adapted to be attached to the ceiling and including a projecting part having an exterior threading, an intermediate part having a central hole adapted to be moved along the projecting part of the suspension device and to be fastened thereto in a desired position, the intermediate part having elastic arms extending upwards from the intermediate part, the elastic arms coming in contact with the ceiling, pressing the intermediate part downwards and keeping the suspension device, when fastened to the intermediate part, in a relatively firm position in relation to the ceiling, and a cover comprising a portion having a hole with an interior threading for cooperation with the exterior threading of the projecting portion to allow, by rotating the cover to take a desired position along the projecting elongated portion, the suspension device then being held in position by the intermediate part, for pressing an upper edge of the cover against the ceiling or for making an upper edge of the cover to be in engagement with the surface of the ceiling, not leaving any substantial space between said upper edge and the ceiling.

21. A ceiling suspension assembly according to claim 20, wherein the intermediate part comprises a bottom part having a hole provided with means for fastening to the projecting portion and elastic arms projecting upwards from the bottom part.

22. A ceiling suspension assembly according to claim 20, wherein the end of the suspension device is made in a coned shape, and the top end of the elongated portion in the nut part of the cover is upwards widening i.e. has the shape of a funnel, so that these parts can easily engage inside the cover, allowing an easy mounting of the ceiling suspension assembly.

* * * * *